(12) United States Patent
Hayashi et al.

(10) Patent No.: US 7,789,784 B2
(45) Date of Patent: Sep. 7, 2010

(54) STEERING DEVICE

(75) Inventors: Kenji Hayashi, Toyoake (JP);
Masatoshi Nakatsu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 671 days.

(21) Appl. No.: 11/794,818

(22) PCT Filed: Feb. 7, 2006

(86) PCT No.: PCT/JP2006/302430
§ 371 (c)(1),
(2), (4) Date: Jul. 6, 2007

(87) PCT Pub. No.: WO2006/085644
PCT Pub. Date: Aug. 17, 2006

(65) Prior Publication Data
US 2008/0184838 A1      Aug. 7, 2008

(30) Foreign Application Priority Data
Feb. 14, 2005  (JP) ............... 2005-035861
Aug. 19, 2005  (JP) ............... 2005-238625

(51) Int. Cl.
B62D 12/02         (2006.01)
(52) U.S. Cl. .......................... 475/18; 475/19
(58) Field of Classification Search ............ 475/18, 475/19, 21, 28
See application file for complete search history.

(56) References Cited

U.S. PATENT DOCUMENTS

| | | | |
|---|---|---|---|
| 1,984,830 A * | 12/1934 | Higley | ............. 475/21 |
| 5,327,986 A | 7/1994 | Saita | |
| 5,997,425 A * | 12/1999 | Coutant et al. | ............. 475/18 |
| 6,554,729 B2 * | 4/2003 | Gleasman et al. | ............. 475/18 |
| 6,656,074 B2 * | 12/2003 | Andriani | ............. 475/28 |
| 2003/0111290 A1 | 6/2003 | Geyer et al. | |

FOREIGN PATENT DOCUMENTS

| | | |
|---|---|---|
| AT | 006 683 | 2/2004 |
| DE | 199 02 556 | 7/2000 |
| JP | 10 324253 | 12/1998 |
| JP | 2003 170849 | 6/2003 |
| WO | 01 72571 | 10/2001 |
| WO | 03 053763 | 7/2003 |
| WO | 2004 014713 | 2/2004 |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

In a steering device (200), a first motor (34a) operates in accordance with a steering operation of a steering handle (12), a first steering shaft (52) steers one of the pair of wheels (58), and a first conversion unit converts a rotation of a first rotor (31 a) as a rotation element of the first motor (31a) into an axial-direction movement of the first steering shaft (52). A second motor (34b) operates in accordance with the steering operation of the steering handle (12), a second steering shaft (53) is separated from the first steering shaft (52) and steers the other of the pair of wheels (58), and a second conversion unit converts a rotation of a second rotor (31b) as a rotation element of the second motor (34b) into an axial-direction movement of the second steering shaft (53). A coupling unit (60) couples the first rotor (31a) and the second rotor (31b) together and cancels the coupling of the first rotor (31a) and the second rotor (31b).

9 Claims, 6 Drawing Sheets

STEERING DEVICE

TECHNICAL FIELD

The present invention generally relates to a steering device, and more particularly to a steering device which steers a pair of wheels in accordance with a driver's steering operation of a steering handle.

BACKGROUND ART

A steering device of an automotive vehicle generally includes a rack which is mechanically coupled to a pair of right-hand and left-hand wheels through a tie rod, a steering arm, etc. When a steering wheel is rotated by the driver, the rack is moved in the axial direction so that steering of both the right-hand and left-hand wheels is performed in a united manner with the movement of the rack.

In recent years, there is proposed a method for controlling and adjusting steering of each of the right-hand and left-hand wheels independently by separating the mechanical coupling of the rack from one of the right-hand wheel and the left-hand wheel.

For example, Japanese Laid-Open Patent Application No. 2003-170849 discloses a steering device for automotive vehicle which comprises a plurality of steering actuators disposed for a plurality of wheels respectively, and a link member which associates the plurality of wheels mutually. In this steering device, steering of each of the plurality of wheels is controlled independently by using the link member.

Moreover, Japanese Laid-Open Patent Application No. 10-324253 discloses a steering angle varying device for automotive vehicle in which a rack is movable in the lateral direction of the vehicle according to a steering operation of the steering wheel, and a nut part and a thread part are provided between the rack and the wheels. The steering angle varying device is expanded or contracted by itself to change the steering angle of the wheels according to the steering operation. By adopting such steering device, it is possible to perform control and adjustment of steering according to the running conditions of the vehicle, such as turning speed.

The steering device in which steering of each of the pair of wheels is performed independently is demanded that, even if a problem arises in the actuator for steering one of the pair of wheels, the steering of all the wheels is carried out safely and reliably.

In this respect, there is no teaching in Japanese Laid-Open Patent Application No. 10-324253 as to how to perform the steering of all the pair of wheels certainly when a problem arises in the actuator for steering one wheel.

In the steering device of Japanese Laid-Open Patent Application No. 2003-170849, when a problem arises in one of the steering actuators, operation of the other steering actuator is transmitted through the link member, so that steering of both the wheels is performed. However, in the steering device of Japanese Laid-Open Patent Application No. 2003-170849, the load exerted on the link member to associate the pair of wheels mutually is heavy, and in order to withstand such heavy load, a large link member must be provided.

DISCLOSURE OF THE INVENTION

An object of the present invention is to provide an improved steering device in which the above-mentioned problems are eliminated.

Another object of the present invention is to provide a steering device which is compact and able to steer each of the pair of wheels certainly in the composition in which steering of each of the pair of wheels is performed independently.

In order to achieve the above-mentioned objects, the present invention provides a steering device which steers a pair of wheels in accordance with a steering operation of a steering handle, the steering device comprising: a first motor operating in accordance with the steering operation of the steering handle; a first steering shaft steering one of the pair of wheels; a first conversion unit converting a comparatively low torque rotation of a first rotor as a rotation element of the first motor into an axial-direction movement of the first steering shaft with a comparatively high thrust; a second motor operating in accordance with the steering operation of the steering handle; a second steering shaft which is separated from the first steering shaft and steers the other of the pair of wheels; a second conversion unit converting a comparatively low torque rotation of a second rotor as a rotation element of the second motor into an axial-direction movement of the second steering shaft with a comparatively high thrust; and a coupling unit coupling the first rotor and the second rotor together and canceling the coupling of the first rotor and the second rotor.

According to the above-mentioned steering device of the invention, the first rotor and the second rotor of low torque can be coupled, and the coupling of the first rotor and the second rotor can be canceled. For this reason, when a problem arises in either the first motor or the second motor, the first rotor and the second rotor can be coupled with a low load, and the first steering shaft and the second steering shaft can be interlocked. Therefore, the coupling unit which couples the first rotor and the second rotor can be made compact, and it is possible to provide a compact steering device which can steer the pair of wheels certainly.

The above-mentioned steering device of the invention may be configured so that the coupling unit comprises a differential unit providing a differential operation between the first rotor and the second rotor, and a locking unit locking the differential unit. According to the above-mentioned steering device, the differential operation between the first rotor and the second rotor is locked, and the first rotor and the second rotor can be coupled. The coupling of the first rotor and the second rotor can be canceled by canceling the differential lock. For this reason, the use of the differential unit enables the coupling of the first rotor and the second rotor with a low load. Therefore, the differential unit used can be compact, and miniaturizing the whole steering device is possible.

The above-mentioned steering device of the invention may be configured so that the differential unit has a planetary gear mechanism comprising: a first solar gear connected with the first rotor and rotatably supported; a first internal gear rotatably supported and coaxially with the first solar gear; a first planet gear engaged with the first solar gear and the first internal gear; a second solar gear connected with the second rotor and rotatably supported; a second internal gear disposed coaxially with the second solar gear in which rotation of the second internal gear is inhibited; and a second planet gear engaged with the second solar gear and the second internal gear and rotatably connected with the first planet gear and coaxially with the first planet gear, and wherein the locking unit locks rotation of the first internal gear so that the differential unit is locked. According to the above-mentioned steering device, a differential mechanism can be simply constituted by using the planetary gear mechanism.

The above-mentioned steering device of the invention may be configured so that the differential unit comprises a third motor which drives the first internal gear. According to the above-mentioned steering device, not only the first motor and the second motor but also the third motor can be used for steering control which attains right-and-left independence, and the load on the first motor and the second motor can be reduced.

The above-mentioned steering device of the invention may be configured so that the locking unit has a torque transmission unit provided between the first internal gear and the third motor, and the torque transmission unit is provided to transmit an input torque to the first internal gear when the input torque is given from the third motor, and provided to inhibit transmission of an input torque to the third motor and locks rotation of the second internal gear when the input torque is given from the second internal gear. According to the above-mentioned steering device, if the third motor is driven, the differential operation between the first rotor and the second rotor can be given. If the third motor is not driven, the first rotor and the second rotor can be coupled. For this reason, it is possible to prevent occurrence of a problem in the locking unit when coupling the first rotor and the second rotor, and reliability of the steering device can be raised.

The above-mentioned steering device of the invention may be configured so that the steering device further comprises a motor problem detecting unit which detects a problem in any of the first motor and the second motor, and the coupling unit is provided to cancel coupling of the first rotor and the second rotor when no problem in both the first motor and the second motor is detected by the motor problem detecting unit, and provided to couple the first rotor and the second rotor together when a problem in at least one of the first motor and the second motor is detected by the motor problem detecting unit. According to the above-mentioned steering device, when a problem arises in one of the two motors, steering of one of the pair of wheels can be performed appropriately.

The above-mentioned steering device of the invention may be configured so that, when a problem in one of the first motor and the second motor is detected by the motor problem detecting unit, the other of the first motor and the second motor is operated in accordance with the steering operation of the steering handle. According to the above-mentioned steering device, even when a problem arises in either the first motor or the second motor, the steering operation by the driver can be assisted by operating the motor of the other side which is determined as being normal.

The above-mentioned steering device of the invention may be configured so that the steering device further comprises a rotation angle detection unit which detects a difference between a rotation angle of the first motor and a rotation angle of the second motor, wherein, before the first rotor and the second rotor are coupled together by the coupling unit, the third motor is operated so that the rotation angle difference detected by the rotation angle detection unit is set to zero. According to the above-mentioned steering device, when a problem arises in either the first motor or the second motor, while the rotation angle difference of the first rotor and the second rotor is set to zero, the first rotor and the second rotor can be coupled together. Therefore, steering of each of the pair of wheels can be performed with a proper steering angle.

The above-mentioned steering device of the invention may be configured so that the steering device further comprises an input shaft connected with the steering handle, an output shaft connected with either the first steering shaft or the second steering shaft through a steering gear, and a transfer ratio varying unit having a differential generating mechanism and a motor, the transfer ratio varying unit operating the differential generating mechanism by driving the motor, and varying a transfer ratio between the input shaft and the output shaft. According to the above-mentioned steering device, mechanical coupling of the steering handle and one of the first steering shaft and the second steering shaft can be given through the input shaft and the output shaft. For this reason, the steering shaft having the mechanical coupling can be steered certainly, and, by coupling the first steering shaft and the second steering shaft, steering of each of the pair of wheels can be performed certainly.

According to the above-mentioned invention, it is possible to provide a compact steering device which can steer each of the pair of wheels certainly in the composition in which steering of each of the pair of wheels is performed independently.

BRIEF DESCRIPTION OF THE DRAWINGS

Other objects, features and advantages of the present invention will be apparent from the following detailed description when reading in conjunction with the accompanying drawings.

BEST MODE FOR CARRYING OUT THE INVENTION

A description will now be given of an embodiment of the invention with reference to the accompanying drawings.

Figure 1:
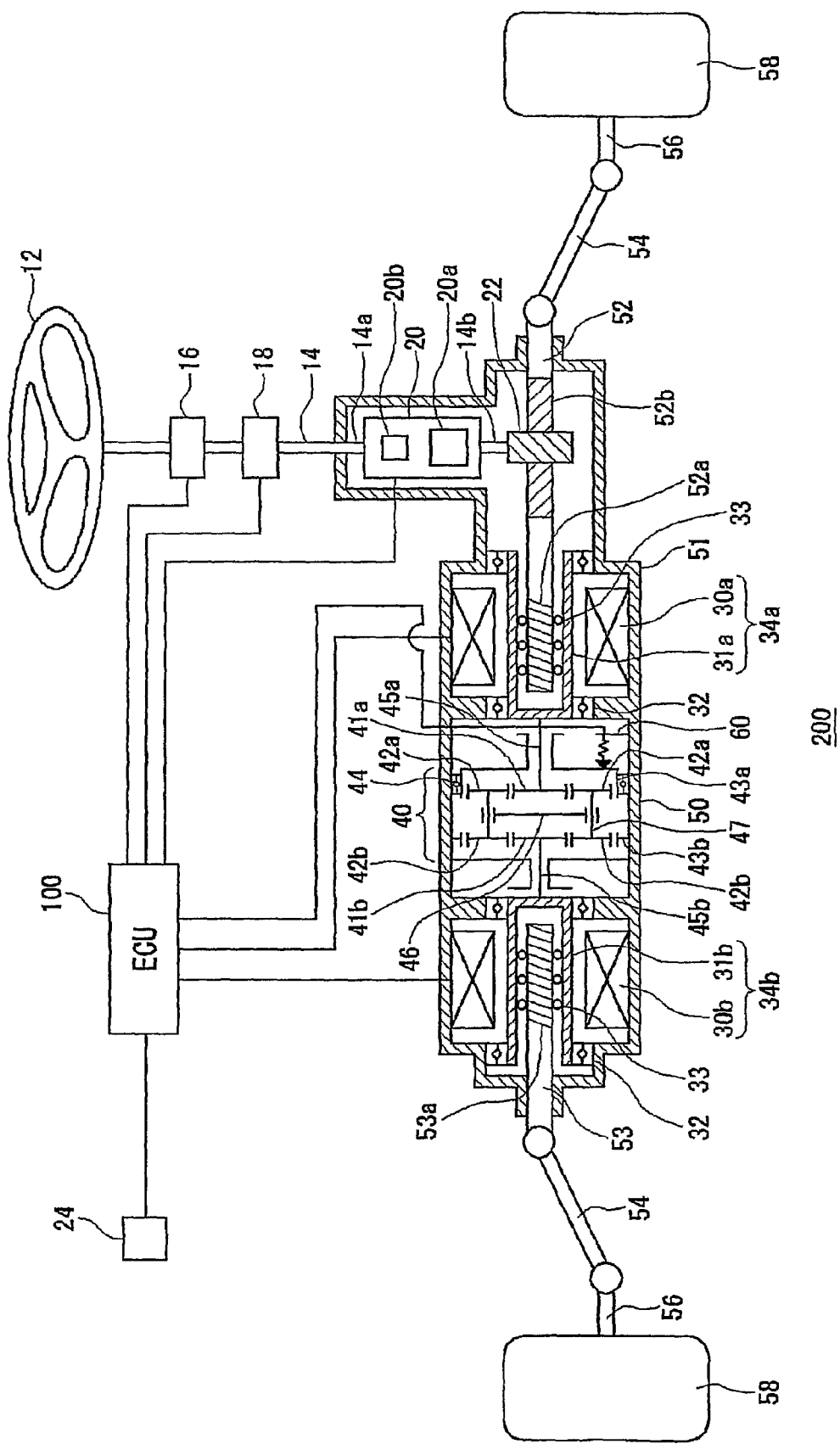
FIG. 1 is a diagram showing the composition of a steering device in an embodiment of the invention.

FIG. 1 shows the composition of a steering device 200 in an embodiment of the invention. The steering device 200 when it is viewed in a direction from the rear to the front of the vehicle is shown in FIG. 1.

The steering device 200 comprises a steering handle 12 which is operated by the driver, a steering shaft 14 which is coupled to the steering handle 12, and a steering mechanism 50 which is provided at the lower edge of the steering shaft 14. A pinion gear 22 is attached to the lower edge of the steering shaft 14, and the pinion gear 22 is engaged with the rack gear teeth 52b of a first rack shaft 52 in the steering mechanism 50. It constitutes a rack and pinion mechanism. The first rack shaft 52 is movably supported in the vehicle so that the first rack shaft 52 is movable in the vehicle width direction.

One end of a tie rod 54 is connected with the end of the first rack shaft 52. The other end of the tie rod 54 is connected with a steering arm 56 which supports a right-hand wheel 58 of the vehicle. The steering arm 56 is rotatable around the kingpin (which is not illustrated) as a fulcrum.

When the steering handle 12 is operated to rotate the steering shaft 14, the rotation of the steering shaft 14 is converted into a rectilinear motion of the first rack shaft 52 in the right/left direction of the vehicle by the steering mechanism 50. This rectilinear motion is converted into a rotation of the steering arm 56 around the kingpin, so that steering of the right-hand wheel 58 is performed.

The steering shaft 14 is divided into an input shaft 14a which is connected with the steering handle 12, and an output shaft 14b which is connected with the steering mechanism 50.

The output shaft 14b and the input shaft 14a are coupled together through a transfer ratio varying device 20.

The transfer ratio varying device 20 is a device that is capable of controlling the transfer characteristics between the steering handle 12 and the wheel 58, based on the information, including the vehicle speed, the steering angle, etc. in order to raise the steering operability, irrespective of the road speed.

The transfer ratio varying device 20 comprises a deceleration mechanism 20a, a motor (not shown), and a locking mechanism which couples the input shaft 14a and the output shaft 14b directly. Rotation of the steering handle 12 is transmitted to the housing of the motor of the transfer ratio varying device 20 through the input shaft 14a.

The deceleration mechanism 20a of the transfer ratio varying device 20 is constituted as a differential generating mechanism. The differential generating mechanism drives a motor to rotate the cam of the undulation generator fixed to the revolving shaft of the motor so that a rotation difference between a stator gear and a driven gear is produced through a flexible gear. This rotation difference is taken out and added to rotation of the stator gear itself which is transmitted from the input shaft 14a. Thereby, it is possible to generate a steering angle of the output shaft 14b that is larger than the steering angle of the steering handle 12.

A locking mechanism 20b is also provided in the transfer ratio varying device 20. The locking mechanism 20b operates the solenoid to engage the lock pin with the slot, and the rotation of the output shaft 14b to the input shaft 14a is inhibited. Thereby, the whole transfer ratio varying device 20 is rotated in a united manner. A rotation sensor which is not illustrated is provided in the motor of the transfer ratio varying device 20, and this rotation sensor is connected to an electronic control unit 100 (which is called ECU 100). The ECU 100 is a control unit of the steering device 200.

The ECU 100 determines whether a problem arises in the transfer ratio varying device 20 based on a detection result of the rotation sensor. When a problem arises in the transfer ratio varying device 20, the ECU 100 inputs an actuation signal to the locking mechanism 20b, so that the transfer ratio varying device 20 is rotated in a united manner. This enables steering of the wheel 58 through the steering handle 12 to be performed with the fixed transfer ratio. Thereby, the influence of the defective transfer ratio varying device 20 on the running condition of the vehicle can be minimized.

A steering angle sensor 16 is provided in the input shaft 14a, and this steering angle sensor 16 detects a steering angle and a steering direction of the steering handle 12 by detecting the rotation angle of the input shaft 14a. A steering torque sensor 18 is provided in the input shaft 14a, and this steering torque sensor 18 detects a steering torque given to the steering handle 12 by the driver. The steering angle, the steering direction, and the steering torque of the steering handle 12, which are detected by the steering angle sensor 16 and the steering torque sensor 18, are inputted to the ECU 100.

The steering mechanism 50 comprises the first rack shaft 52 which performs steering of the right-hand wheel of the vehicle, a second rack shaft 53 which performs steering of the left-hand wheel of the vehicle, a first motor 34a which drives the first rack shaft 52, a second motor 34b which drives the second rack shaft 53, and a differential mechanism 40 which is provided between the first motor 34a and the second motor 34b.

The first motor 34a is constituted by a first stator 30a fixed to a rack housing 51, and a first rotor 31a rotatably supported by a rack housing 51 through a bearing 32. The first rotor 31a is formed in a cylindrical configuration and contains one end of the first rack shaft 52. The thread part is formed on the inner periphery of the first rotor 31a, and the ball screw nut is constituted.

On the other hand, a thread groove-like first rolling way 52a is formed on the peripheral part of one end of the first rack shaft 52, and a plurality of rolling balls 33 are inserted in the first rolling way 52a so that they are freely rolled. Thus, a ball screw mechanism is constituted by connecting the thread part and the first rolling way 52a of the inner periphery of the first rotor 31a through the rolling balls 33.

When the first rotor 31a is rotated by driving of the first motor 34a, the above-mentioned ball screw mechanism functions to convert the rotation torque of the first rotor 31a into an axial-direction thrust of the first rack shaft 52 through the balls 33 rolling on the first rolling way 52a. Thereby the first rack shaft 52 is moved in the axial direction. Therefore, the ball screw mechanism serves as a conversion unit which converts a rotation of the first motor 34a having a comparatively low torque into an axial direction movement of the first rack shaft 52 having a comparatively high thrust. Alternatively, other screw mechanisms, such as a screw mechanism having no rolling ball 33d, may be used instead of the ball screw mechanism.

The ECU 100 computes an assisting torque for steering of the right-hand wheel 58 of the vehicle based on the detection results of the steering torque sensor 18 and the road speed sensor 24, and controls the driving of the first motor 34a to generate a driving torque corresponding to the assisting torque. In this way, the first motor 34a is driven and the first rack shaft 52 is moved in the axial direction, so that the steering operation of the steering handle 12 by the driver is assisted for steering of the right-hand wheel 58 of the vehicle.

The second motor 34b is also constituted by a second stator 30b fixed to the rack housing 51, and a second rotor 31b rotatably supported by the rack housing 51 through the bearing 32. When the second rotor 31b is rotated by driving of the second motor 34b, the ball screw mechanism (which is similar to the above-mentioned one) functions to convert the rotation torque of the second motor 34b into an axial-direction thrust of the second rack shaft 53 through the balls 33 rolling on the second rolling way 53a. Thereby the second rack shaft 53 is moved in the axial direction. Therefore, the ball screw mechanism serves as a conversion unit which converts a rotation of the second motor 34b having a comparatively low torque into an axial direction movement of the second rack shaft 53 having a comparatively high thrust. Alternatively, other screw mechanisms, such as a screw mechanism having no rolling ball 33, may be used instead of the above-mentioned ball screw mechanism.

Similar to the first rack shaft 52, one end of a tie rod 54 is connected with the end of the second rack shaft 53, and the other end of the tie rod 54 is connected with a steering arm 56 which supports a left-hand wheel 58. Thereby, when the second rack shaft 53 is driven in the axial direction, steering of the left-hand wheel 58 of the vehicle is performed.

The ECU 100 computes a steering angle which steers the left-hand wheel 58 of the vehicle based on a detection result of the steering angle sensor 16, and controls the driving of the second motor 34b so that the second rack shaft is moved by the length corresponding to the steering angle. In this way, the second motor 34b is driven and the first rack shaft 52 is moved in the axial direction, so that steering control in which steering of the left-hand wheel 58 of the vehicle is controlled independently is realized.

A rotation sensor (which is not illustrated) is provided internally in each of the first motor 34a and the second motor 34b. The detection results of the rotation sensors are inputted to the ECU 100. Based on the detection results of the rotation sensors, the ECU 100 determines a rotation speed of each of the first motor 34*a* and the second motor 34*b*, and determines whether a problem arises in each of the first motor 34*a* and the second motor 34*b*.

A differential mechanism 40 is provided between the first motor 34*a* and the second motor 34*b*. The differential mechanism 40 is constituted by two planetary gear mechanisms. One of the two planetary gear mechanisms is constituted by a first solar gear 41*a*, a first planet gear 42*a*, and a first internal gear 43*a*, The other planetary gear mechanism is constituted by a second solar gear 41*b*, a second planet gear 42*b*, and a second internal gear 43*b*. The differential mechanism 40 includes a supporting plate 46.

The first solar gear 41*a*, the second solar gear 41*b*, and the first internal gear 43*a* are rotatably supported to the rack housing 51 and coaxially with the first rotor 31*a* and the second rotor 31*b*.

The first solar gear 41*a* is connected with the end of the first rotor 31*a* through a first transmission shaft 45*a*. The first internal gear 43*a* is provided in the outside peripheral portion of the first solar gear 41*a*, and the first planet gear 42*a* is engaged with the external teeth of the first solar gear 41*a* and the internal teeth of the first internal gear 43*a*, The first internal gear 43*a* is rotatably supported to the rack housing 51 through a bearing 44.

The second solar gear 41*b* is connected with the end of the second rotor 31*b* through a second transmission shaft 45*b*. The second internal gear 43*b* is provided in the outside peripheral portion of the second solar gear 41*b*, and the second planet gear 42*b* is engaged with the external teeth of the second solar gear 41*b* and the internal teeth of the second internal gear 43*b*. The outside peripheral portion of the second internal gear 43*b* is fixed to the rack housing 51, and rotation of the second internal gear 43*b* to the rack housing 51 is inhibited.

The first planet gear 42*a* and the second planet gear 42*b* are coupled together by third transmission shafts 47 through the bearings (not illustrated) such that they are rotatable mutually. These third transmission shafts 47 are inserted in the through holes of the supporting plate 46, and they are supported such that mutual movement of the three third transmission shafts 47 is locked.

All the gear specifications of the first solar gear 41*a* and the second solar gear 41*b*, such as a pitch circle radius of the outside peripheral gear part, a pitch, the number of teeth, are the same. Similarly, all the gear specifications of the first planet gear 42*a* and the second planet gear 42*b* are the same, and all the gear specifications of the first internal gear 43*a* and the second internal gear 43*b* are the same.

A locking mechanism 60 is provided inside the rack housing 51 and in the vicinity of the differential mechanism 40, and this locking mechanism 60 locks the differential of the differential mechanism 40. The locking mechanism 60 is fixed to the rack housing 51 and causes the lock pin to move forward to (or move backward from) the slot provided in the first internal gear 43*a* by using the solenoid and the return spring which are not illustrated. In this way, the lock pin is engaged with the slot, the first internal gear 43*a* is fixed to the rack housing 51, and rotation of the first internal gear 43*a* is locked.

When the locking action of the locking mechanism 60 is canceled in the above-described composition and rotation of the first internal gear 43*a* is allowed, the first internal gear 43*a* is rotated, and the differential can be produced between the first rotor 31*a* and the second rotor 31*b*.

When rotation of the first internal gear 43*a* is locked by the locking mechanism 60, the differential given to the first rotor 31*a* and the second rotor 31*b* is locked by the differential mechanism 40. In this case, the respective gears of the planetary gear mechanism on the side of the first rotor 31*a* and the planetary gear mechanism on the side of the second rotor 31*b* have the same gear specifications. If rotation of the first solar gear 41*a* and rotation of the second solar gear 41*b* are considered as the input and the output, the ratio of the input : the output is set to 1:1. Therefore, the first rotor 31*a* and the second rotor 31*b* in this case are set in the state where they are coupled together through the differential mechanism 40.

The configuration of the ball screw nut portion formed in the inside diameter and inner periphery of the first rotor 31*a* is the same as that of the second rotor 31*b*. The configuration of the first rolling way 52*a* formed in the outer diameter and peripheral portion of the first rack shaft 52 is the same as the configuration of the outer diameter and the second rolling way 53*a* of the second rack shaft 53. For this reason, the first rotor 31*a* and the second rotor 31*b* are coupled together and rotated mutually through the differential mechanism 40, and the first rack shaft 52 and the second rack shaft 53 are moved by the same distance in the same direction.

The ECU 100 determines whether a problem arises in the first motor 34*a* and/or the second motor 34*b*, based on the detection results of the rotation sensors provided in the first motor 34*a* and the second motor 34*b*. When it is determined that a problem arises in the first motor 34*a* and/or the second motor 34*b*, the ECU 100 turns off the solenoid of the locking mechanism 60 and causes the return spring to lock the differential of the differential mechanism 40. Thereby, the first rotor 31*a* and the second rotor 31*b* are coupled through the differential mechanism 40, and the first rack shaft 52 and the second rack shaft 53 are moved by the same distance in the same direction. As a result, when a problem arises in the first motor 34*a* and/or the second motor 34*b*, steering of the wheel concerned can be performed appropriately.

Moreover, when the ECU 100 determines that a problem arises in either the first motor 34*a* or the second motor 34*b*, the ECU 100 causes the locking mechanism 60 to lock the differential operation of the differential mechanism 40 and causes the motor of the other side which operates normally to be active, so that the assisting action of the steering operation is performed as mentioned above. Accordingly, even when it is determined that a problem arises in either the first motor 34*a* or the second motor 34*b*, the steering operation by the driver can be assisted.

Figure 2:
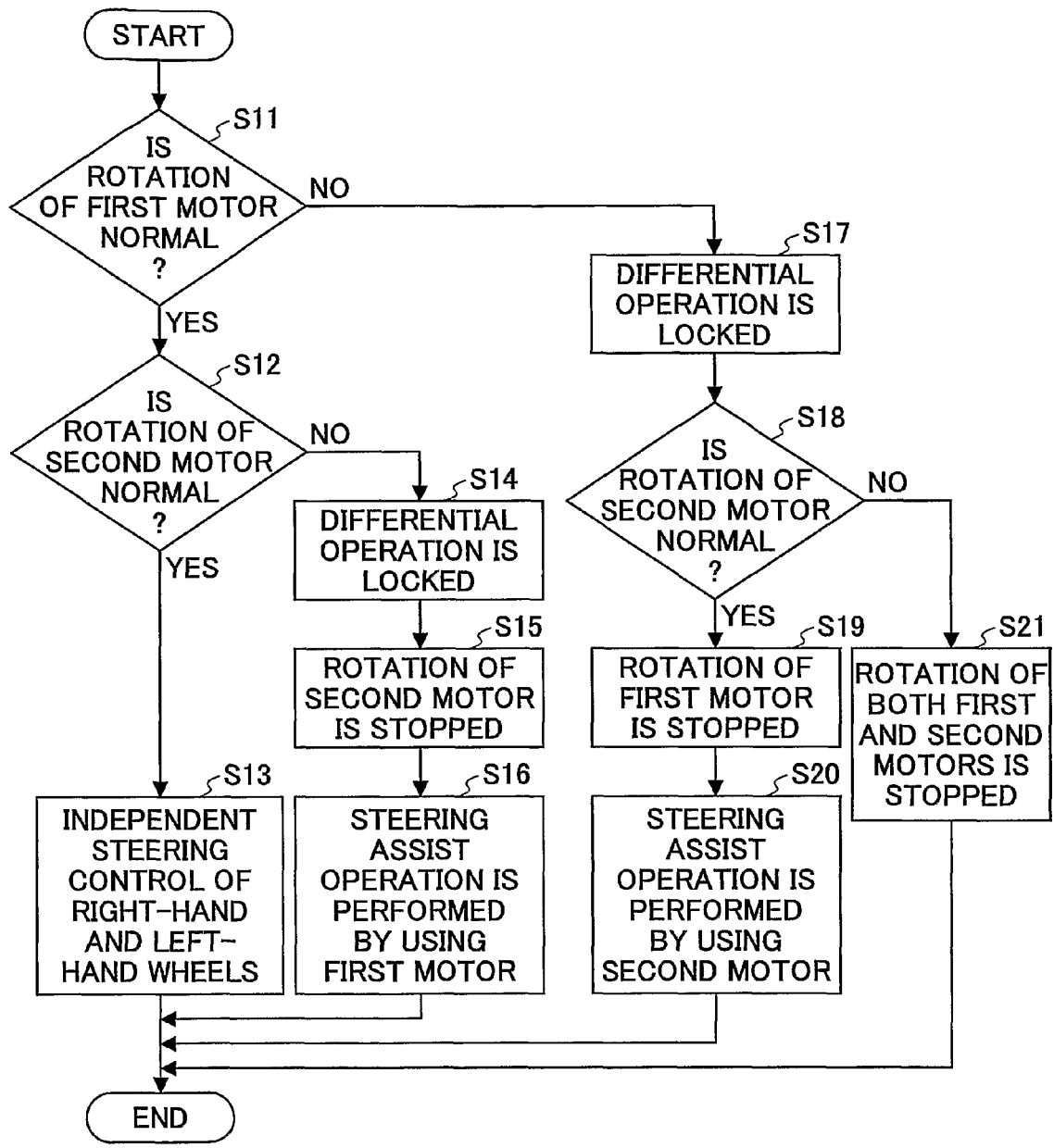
FIG. 2 is a flowchart for explaining the control procedure of the steering device in the present embodiment.

FIG. 2 is a flowchart for explaining the control procedure of the steering device 200 in this embodiment. Execution of the processing shown in FIG. 2 is repeated at intervals of a predetermined time.

The ECU 100 determines whether a problem arises in the first motor 34*a* based on the detection result of the rotation sensor provided in the first motor 34*a* (S11).

When there is no problem in the first motor 34*a* (Yes of S11), the ECU 100 determines whether a problem arises in the second motor 34*b* based on the detection result of the rotation sensor provided in the second motor 34*b* (S12).

When it is determined that there is no problem in both the first motor 34*a* and the second motor 34*b* (Yes of S12), the ECU 100 inputs the actuation signals which are independent of each other to the first motor 34*a* and the second motor 34*b* respectively, so that steering control of the pair of wheels is performed independently (S13). Thereby, the running performance of the vehicle can be raised. At this time, the differential operation of the first rack shaft 52 and the second rack shaft 53 is absorbed by the differential mechanism 40.

When it is determined that there is no problem in the first motor 34a and a problem arises in the second motor 34b (No of S12), the ECU 100 locks the differential operation of the differential mechanism 40 by inputting a predetermined actuation signal to the solenoid of the locking mechanism 60 (S14). Next, the ECU 100 stops the rotation of the second motor 34b which is determined as being defective (S15), and performs the steering assist operation of the steering handle 12 only by the first motor 34a (S16).

When a problem arises in the first motor 34a (No of S11), the ECU 100 locks the differential operation of the differential mechanism 40 by inputting a predetermined actuation signal to the solenoid of the locking mechanism 60 (S17).

Next, the ECU 100 determines whether a problem arises in the second motor 34b based on the detection result of the rotation sensor provided in the second motor 34b (S18).

When it is determined that there is no problem in the second motor 34b (Yes of S18), the ECU 100 stops the rotation of the first motor 34a which is determined as being defective (S19), and performs the steering assist operation of the steering handle 12 only by the second motor 34b (S20).

When it is determined that there is a problem also in the second motor 34b (No of S18), the ECU 100 stops the rotation of the first motor 34a and the second motor 34b which are determined as being defective (S21). Even when the problems arise in both the first motor 34a and the second motor 34b each of which performs steering of one of the pair of wheels, it is possible to steer the pair of wheels 58 appropriately.

Figure 3:
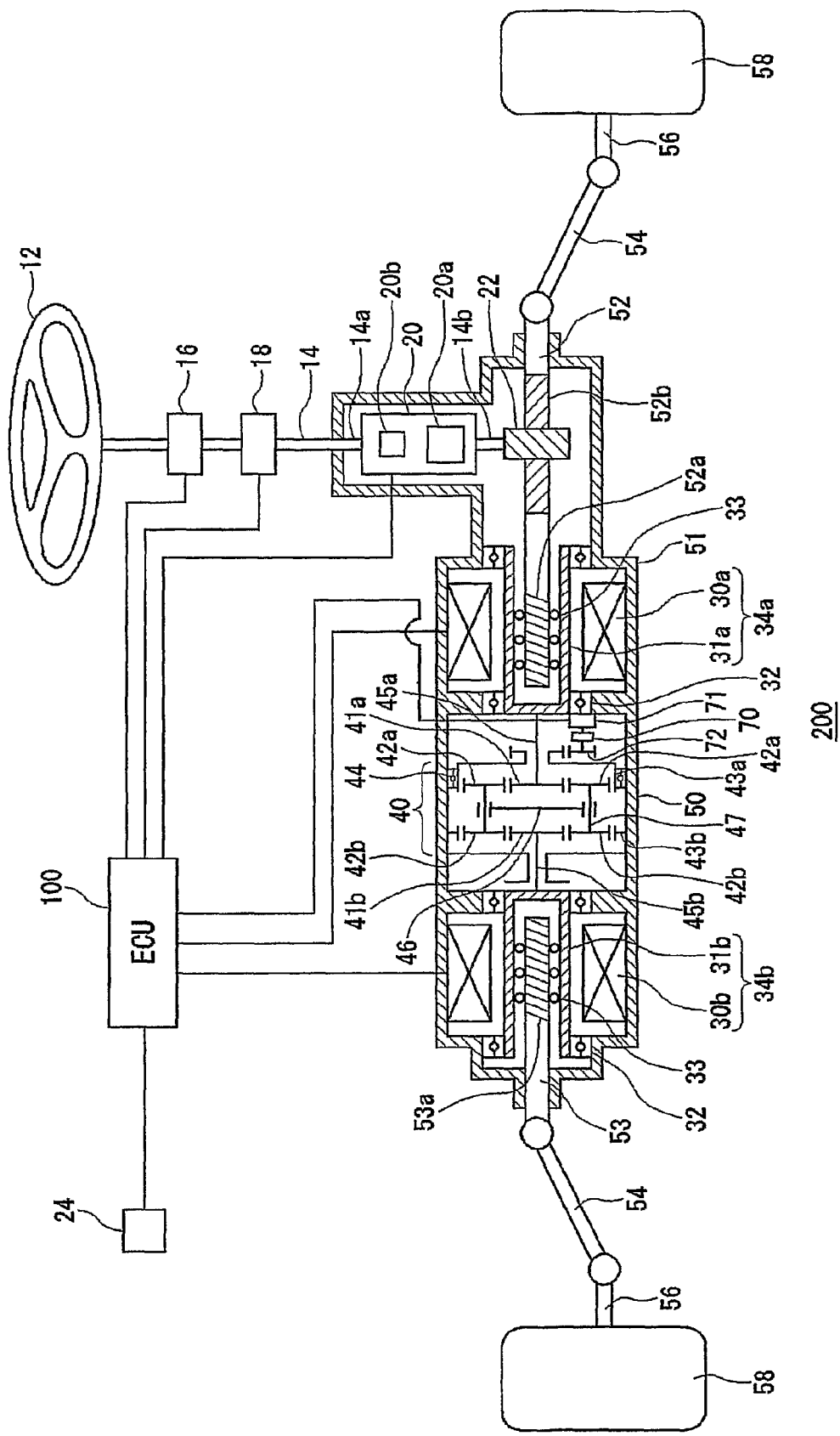
FIG. 3 is a diagram showing the composition of a steering device in another embodiment of the invention.

Next, a description will be given of another embodiment of the invention. FIG. 3 is a diagram showing the composition of a steering device 200 in this embodiment.

The steering device 200 of this embodiment is essentially the same as that of the previous embodiment of FIG. 1. For example, similar to the previous embodiment, the steering mechanism 50 of this embodiment comprises the differential mechanism 40 which includes the first motor 34a, the second motor 34b, and the planetary gear mechanism provided between the first motor 34a and the second motor 34b.

In this embodiment, a gear 72, a third motor 71, and a reverse input inhibition mechanism 70 are provided instead of the locking mechanism 60 in the previous embodiment of FIG. 1. The third motor 71 is fixed to the rack housing 51. The gear 72 is engaged with the gear part fixed to the first internal gear 43a, The third motor 71 and the gear 72 are connected through the reverse input inhibition mechanism 70.

The reverse input inhibition mechanism 70 transmits an input torque to the output shaft when the input torque is given from the input shaft. However, when a torque is given from the output shaft, the reverse input inhibition mechanism 70 does not transmit this torque to the input shaft and locks rotation of the output shaft. A locking type mechanism is adopted for the reverse input inhibition mechanism 70.

In this embodiment, the reverse input inhibition mechanism 70 transmits an input torque to the gear 72 when the input torque is given from the third motor 71. However, when an input torque is given from the gear 72, the reverse input inhibition mechanism 70 does not transmit this torque to the third motor 71 and locks rotation of the gear 72.

Accordingly, when it is desired to generate a differential operation between the first rotor 31a and the second rotor 31b, what is necessary is just to drive the third motor 71. On the other hand, if the third motor 71 is not driven, the first rotor 31a and the second rotor 31b can be connected together through the reverse input inhibition mechanism 70. Thus, steering of the pair of wheels can be performed appropriately and reliability can be raised.

The ECU 100 determines whether a problem arises in any of the first motor 34a, the second motor 34b and the third motor 71, based on the detection results of the rotation sensors provided in the first motor 34a, the second motor 34b and the third motor 71.

When it is determined that there is no problem in any motor, the ECU 100 inputs the actuation signals, which are independent of each other, to the first motor 34a and the second motor 34b respectively, so that steering control of each of the pair of wheels is performed independently. If the third motor 71 is not driven in this embodiment, the differential operation does not occur between the first rotor 31a and the second rotor 31b. Thus, the ECU 100 computes a differential which should be given between the first rotor 31a and the second rotor 31b, and drives the third motor 71 so that the computer differential may be generated. Not only the first motor 34a and the second motor 34b but also the third motor 71 can be used for performing the steering control independently, and the load on each of the motors 34a, 34b and 71 can be reduced.

Figure 4:
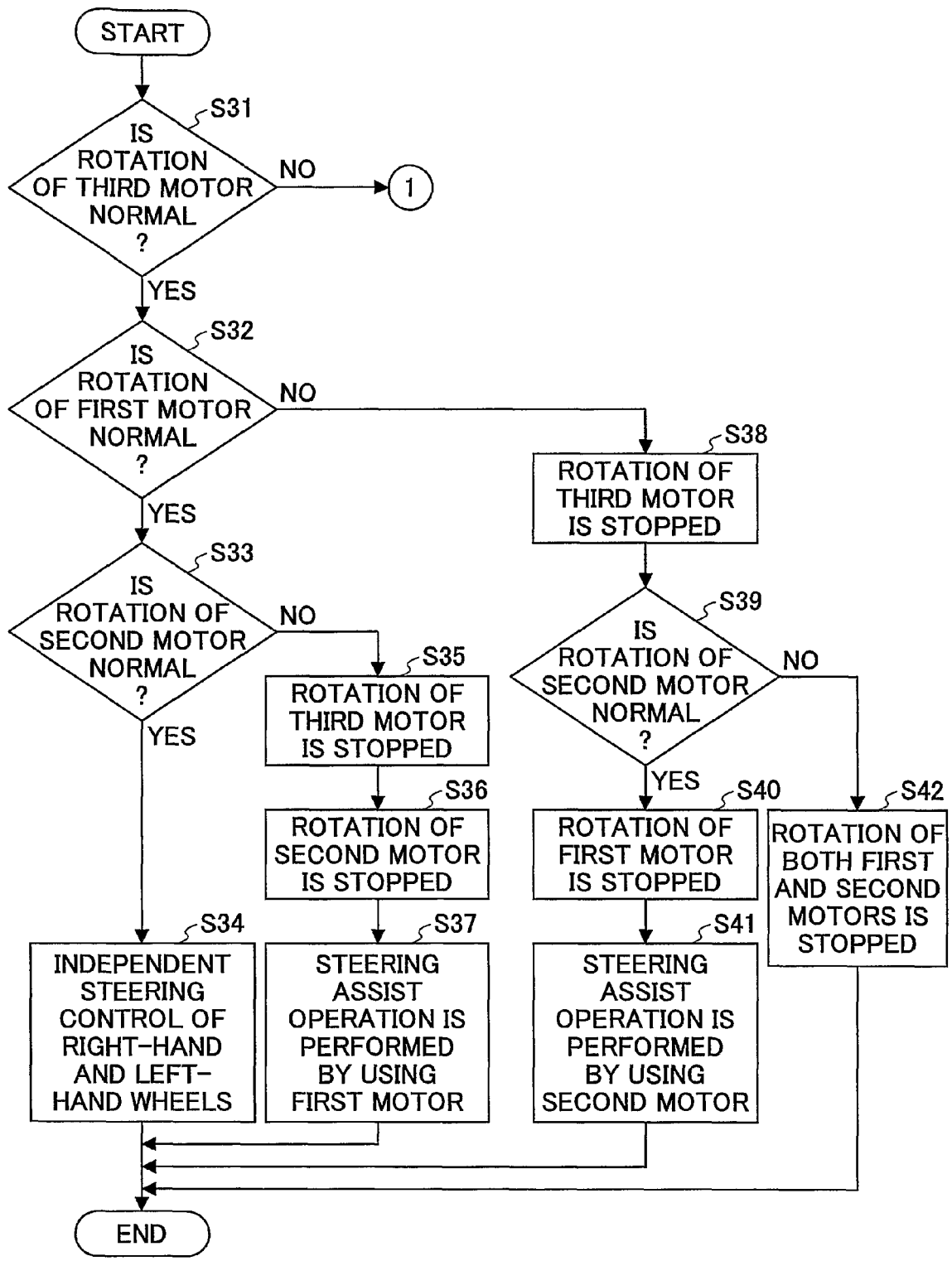
FIG. 4 is a flowchart for explaining the control procedure of the steering device in the present embodiment.

FIG. 4 is a flowchart for explaining the control procedure of the steering device 200 in this embodiment. Execution of the processing shown in FIG. 4 is repeated at intervals of a predetermined time.

The ECU 100 determines whether a problem arises in the third motor 71 based on the detection result of the rotation sensor provided in the third motor 71 (S31).

When it is determined that a problem arises the third motor 71, the processing of FIG. 5 which will be described later is performed (No of S31).

When it is determined that there is no problem in the third motor 71 (Yes of S31), the ECU 100 determines whether a problem arises in the first motor 34a based on the detection result of the rotation sensor provided in the first motor 34a (S32). When there is no problem in the first motor 34a (Yes of S32), the ECU 100 determines whether a problem arises in the second motor 34b based on the detection result of the rotation sensor provided in the second motor 34b (S33).

When it is determined that there is no problem in both the first motor 34a and the second motor 34b (Yes of S33), the ECU 100 inputs the actuation signal which are independent of each other to the first motor 34a and the second motor 34b respectively, and inputs the actuation signal which allows the differential operation of the differential mechanism 40 to the third motor 71, so that steering control of the pair of wheels is performed independently (S34).

When it is determined that there is no problem in the first motor 34a and a problem arises in the second motor 34b (No of S33), the ECU 100 stops the rotation of the third motor to lock the differential operation between the first rotor 31a and the second rotor 31b (S35), and stops the rotation of the second motor 34b which is determined as being defective (S36). Next, the ECU 100 performs the steering assist operation of the steering handle 12 by using the first motor 34a which is determined as being normal (S37).

When it is determined that a problem arises in the first motor 34a (No of S32), the ECU 100 stops the rotation of the third motor to lock the differential operation between the first rotor 31a and the second rotor 31b (S38). Next, the ECU 100 determines whether a problem arises in the second motor 34b based on the detection result of the rotation sensor provided in the second motor 34b (S39).

When it is determined that there is no problem in the second motor 34b (Yes of S39), the ECU 100 stops the rotation of the first motor 34a which is determined as being defective (S40), and performs the steering assist operation of the steering handle 12 by using the second motor 34b which is determined as being normal (S41).

When it is determined that there is a problem also in the second motor 34b (No of S39), the ECU 100 stops the rotation of both the first motor 34a and the second motor 34b which are determined as being defective (S42).

Before locking the differential operation between the first rotor 31a and the second rotor 31b, the ECU 100 computes a difference between the rotation angles of the first rotor 31a and the second rotor 31b detected by the rotation sensors provided in the first motor 34a and the second motor 34b, and operates the third motor 71 so that the difference between the rotation angles of the first rotor 31a and the second rotor 31b may be set to zero. Thereby, when a problem arises in either the first motor 34a or the second motor 34b, the differential operation between the first rotor 31a and the second rotor 31b can be locked in the state where the rotation angle difference of the first rotor 31a and the second rotor 31b is eliminated.

Figure 5:
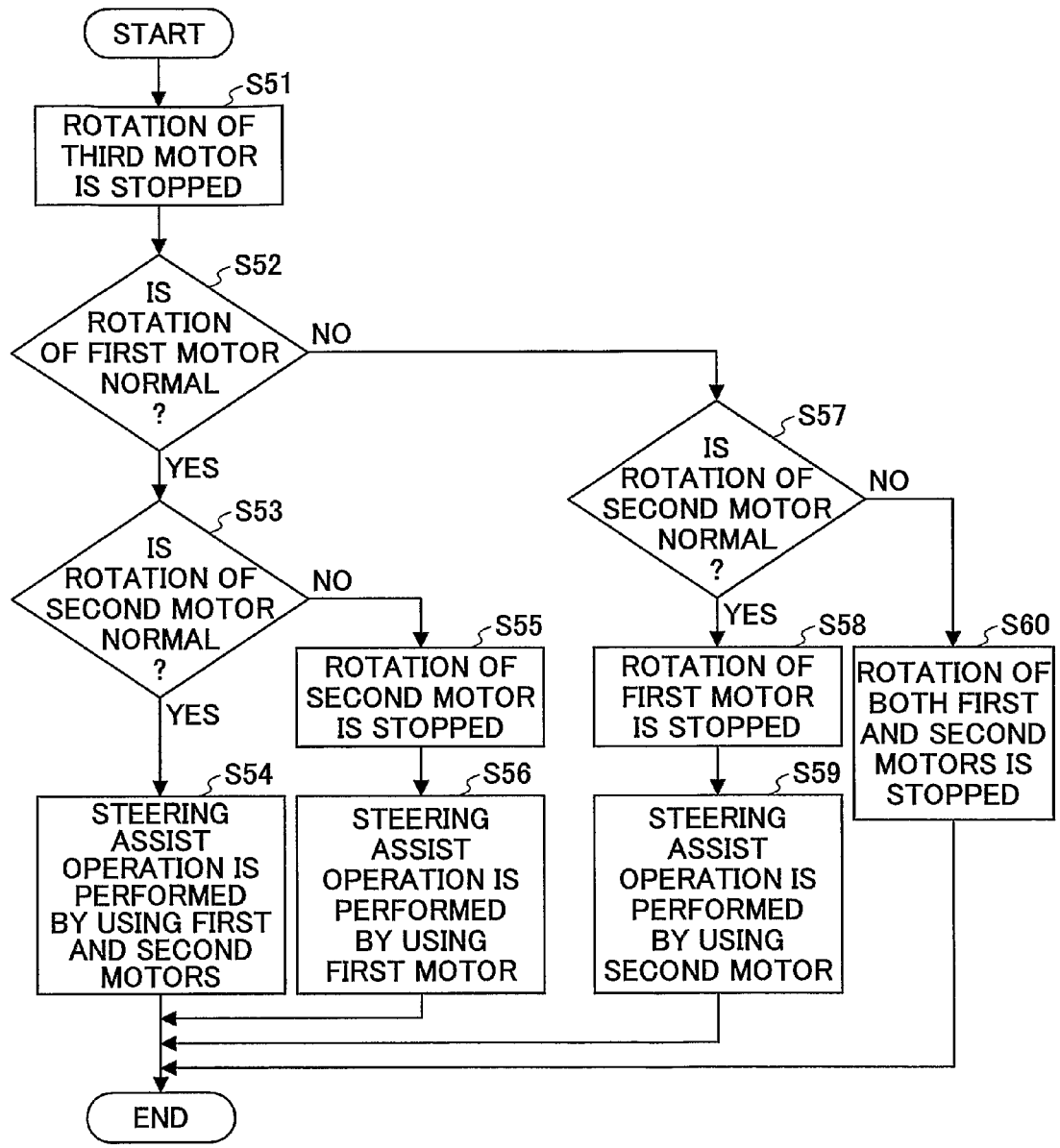
FIG. 5 is a flowchart for explaining the control procedure of the steering device in the present embodiment when a problem arises in the third motor.

FIG. 5 is a flowchart for explaining the control procedure of the steering device 200 in this embodiment when a problem arises in the third motor. Execution of the processing shown in FIG. 5 is repeated at intervals of a predetermined time.

When it is determined that a problem arises in the third motor 71 (No of S31 in FIG. 4), the ECU 100 stops the rotation of the third motor 71 which is determined as being defective (S51). Thereby, the differential operation between the first rotor 31a and the second rotor 31b is locked by the locking type reverse input inhibition mechanism 70.

Next, the ECU 100 determines whether a problem arises in the first motor 34a based on the detection result of the rotation sensor provided in the first motor 34a (S52). Regardless of whether a problem arises in the first motor 34a (Yes of S52) or not (No of S52), the ECU 100 determines whether a problem arises in the second motor 34b based on the detection result of the rotation sensor provided in the second motor 34b (S53, S57).

When it is determined that there is no problem in both the first motor 34a and the second motor 34b (Yes of S53), the ECU 100 inputs the same actuation signal to each of the first motor 34a and the second motor 34b, and performs the steering assist operation of the steering handle 12 by using the first motor 34a and the second motor 34b (S54).

When it is determined that there is no problem in the first motor 34a and a problem arises in the second motor 34b (No of S53), the ECU 100 stops the rotation of the second motor 34b which is determined as being defective (S55). Next, the ECU 100 performs the steering assist operation of the steering handle 12 by using the first motor 34a which is determined as being normal (S56).

When it is determined that a problem arises in the first motor 34a and there is no problem in the second motor 34b (Yes of S57), the ECU 100 stops the rotation of the first motor 34a which is determined as being defective (S58). Next, the ECU 100 performs the steering assist operation of the steering handle 12 by using the second motor 34b which is determined as being normal (S59).

When it is determined that a problem arises in both the first motor 34a and the second motor 34b (No of S57), the ECU 100 stops the rotation of the first motor 34a and the second motor 34b which are determined as being defective (S60).

Figure 6:
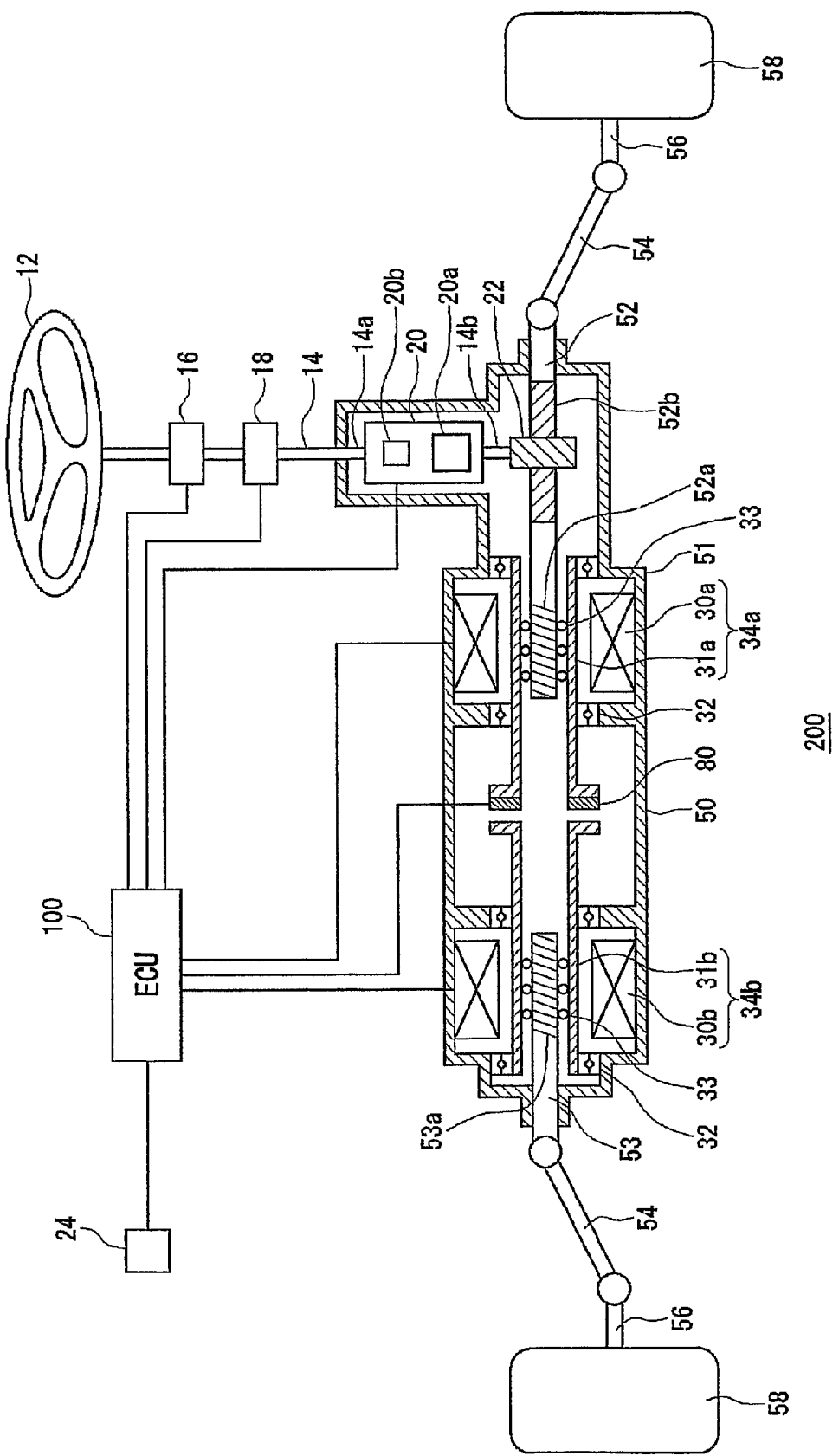
FIG. 6 is a diagram showing the composition of a steering device in another embodiment of the invention.

Next, a description will be given of another embodiment of the invention. FIG. 6 is a diagram showing the composition of a steering device 200 in this embodiment.

In this embodiment, the differential mechanism 40 in the previously described embodiment is not provided, but a clutch 80 is provided.

The clutch 80 is constituted by an electromagnetic clutch. When the clutch 80 is energized, the clutch 80 connects the first rotor 31a and the second rotor 31b together. The ECU 100 inputs a connection signal to the clutch 80 so that the first rotor 31a and the second rotor 31b are connected together. On the other hand, the ECU 100 stops the input of a connection signal to the clutch 80 so that the connection of the first rotor 31a and the second rotor 31b is canceled. Thereby, the first rotor 31a and the second rotor 31b can be connected together by a simple composition without providing the differential mechanism 40.

In the control procedure of the steering device in this embodiment, the control of the clutch 80 to allow or inhibit the connection of the two rotors is substituted for the locking of the differential operation between the two rotors in the flowchart of FIG. 2.

The present invention is not limited to the above-described embodiment, and variations and modifications may be made without departing from the scope of the present invention.

For example, the transfer ratio varying device 20 may be omitted. In such a case, the input shaft 14a and the output shaft 14b of the steering shaft 14 are always coupled together, and the first rack shaft 52 can be moved directly by a steering operation of the steering handle 12 by the driver.

Further, the present application is based upon and claims the benefit of priority of Japanese patent application No. 2005-035861, filed on Feb. 14, 2005, and Japanese patent application No. 2005-238625, filed on Aug. 19, 2005, the entire contents of which are incorporated herein by reference.

The invention claimed is:

1. A steering device which steers a pair of wheels in accordance with a steering operation of a steering handle, comprising:
   a first motor operating in accordance with the steering operation of the steering handle;
   a first steering shaft steering one of the pair of wheels;
   a first conversion unit converting a comparatively low torque rotation of a first rotor as a rotation element of the first motor into an axial-direction movement of the first steering shaft with a comparatively high thrust;
   a second motor operating in accordance with the steering operation of the steering handle;
   a second steering shaft which is separated from the first steering shaft and steers the other of the pair of wheels;
   a second conversion unit converting a comparatively low torque rotation of a second rotor as a rotation element of the second motor into an axial-direction movement of the second steering shaft with a comparatively high thrust; and
   a coupling unit coupling the first rotor and the second rotor together and canceling the coupling of the first rotor and the second rotor.

2. The steering device according to claim 1 wherein the coupling unit comprises a differential unit providing a differential operation between the first rotor and the second rotor, and a locking unit locking the differential unit.

3. The steering device according to claim 2 wherein the differential unit has a planetary gear mechanism comprising: a first solar gear connected with the first rotor and rotatably supported; a first internal gear rotatably supported and coaxially with the first solar gear; a first planet gear engaged with the first solar gear and the first internal gear; a second solar gear connected with the second rotor and rotatably supported; a second internal gear disposed coaxially with the second solar gear in which rotation of the second internal gear is inhibited; and a second planet gear engaged with the second solar gear and the second internal gear and rotatably connected with the first planet gear and coaxially with the first planet gear, and wherein the locking unit locks rotation of the first internal gear so that the differential unit is locked.

4. The steering device according to claim 3 wherein the differential unit comprises a third motor which drives the first internal gear.

5. The steering device according to claim 4 wherein the locking unit has a torque transmission unit provided between the first internal gear and the third motor, and the torque transmission unit is provided to transmit an input torque to the first internal gear when the input torque is given from the third motor, and provided to inhibit transmission of an input torque to the third motor and locks rotation of the second internal gear when the input torque is given from the second internal gear.

6. The steering device according to claim 1 further comprising a motor problem detecting unit which detects a problem in any of the first motor and the second motor, and the coupling unit is provided to cancel coupling of the first rotor and the second rotor when no problem in both the first motor and the second motor is detected by the motor problem detecting unit, and provided to couple the first rotor and the second rotor together when a problem in at least one of the first motor and the second motor is detected by the motor problem detecting unit.

7. The steering device according to claim 6 wherein, when a problem in one of the first motor and the second motor is detected by the motor problem detecting unit, the other of the first motor and the second motor is operated in accordance with the steering operation of the steering handle.

8. The steering device according to claim 4 further comprising a rotation angle detection unit which detects a difference between a rotation angle of the first motor and a rotation angle of the second motor, wherein, before the first rotor and the second rotor are coupled together by the coupling unit, the third motor is operated so that the rotation angle difference detected by the rotation angle detection unit is set to zero.

9. The steering device according to claim 1 further comprising:
an input shaft connected with the steering handle;
an output shaft connected with either the first steering shaft or the second steering shaft through a steering gear; and
a transfer ratio varying unit having a differential generating mechanism and a motor, the transfer ratio varying unit operating the differential generating mechanism by driving the motor, and varying a transfer ratio between the input shaft and the output shaft.

* * * * *